United States Patent
Hatori et al.

(10) Patent No.: US 7,926,708 B2
(45) Date of Patent: Apr. 19, 2011

(54) IMAGE DATA RECORDING METHOD, METHOD OF RECORDING FINISHED WORK BY IMAGE DATA, IMAGE DATA RECORDING APPARATUS, AND FINISHED WORK RECORDING SYSTEM USING IMAGE DATA

(75) Inventors: Fumio Hatori, Tokyo (JP); Shinichi Ebata, Tokyo (JP); Akira Komuro, Tokyo (JP)

(73) Assignee: Hitachi Plant Technologies, Ltd., Tokyo (JP)

( * ) Notice: Subject to any disclaimer, the term of this patent is extended or adjusted under 35 U.S.C. 154(b) by 392 days.

(21) Appl. No.: 12/223,335

(22) PCT Filed: Mar. 13, 2007

(86) PCT No.: PCT/JP2007/054939
§ 371 (c)(1),
(2), (4) Date: Jul. 29, 2008

(87) PCT Pub. No.: WO2007/105720
PCT Pub. Date: Sep. 20, 2007

(65) Prior Publication Data
US 2009/0014514 A1   Jan. 15, 2009

(30) Foreign Application Priority Data
Mar. 15, 2006 (JP) ................................. 2006-071073

(51) Int. Cl.
*G06K 7/10* (2006.01)

(52) U.S. Cl. ......... 235/377; 235/376; 235/491; 235/492

(58) Field of Classification Search ................... 235/376, 235/377, 491
See application file for complete search history.

(56) References Cited

U.S. PATENT DOCUMENTS

| 7,561,786 | B1 * | 7/2009 | Black ............................... 396/57 |
| 2002/0170973 | A1 * | 11/2002 | Teraura ........................ 235/492 |
| 2004/0233040 | A1 * | 11/2004 | Lane et al. ................... 340/5.86 |

FOREIGN PATENT DOCUMENTS

| JP | A 2001-024982 | 1/2001 |
| JP | A 2005-109920 | 4/2005 |

(Continued)

*Primary Examiner* — Michael G Lee
*Assistant Examiner* — Kristy A Haupt
(74) *Attorney, Agent, or Firm* — Oliff & Berridge, PLC (57) ABSTRACT

There is provided a method of recording an image by causing a subject to truly coincide with data relating to the subject. In a finished work recording method using image data by obtaining a product to be recorded and work contents to the product to be recorded as a work recording image, RFID tags 60 (RFID tags 60a, 60b) in each of which inherent tag data is recorded are attached to the product to be recorded and to the work recording worker. Thereafter, whether the tag data are true to the image data of a subject to be worked is determined by comparing a time difference between the time at which the tag data recorded in the RFID tag 60a is read and the time at which the image data of the product to be recorded is obtained with a preset specified time. When it is determined that the tag data are truly associated with the image data, the image data associated with the tag data is recorded as a finished work. In contrast, it is determined that the tag data are falsely associated with the image data, the image data and the tag data are discarded.

10 Claims, 7 Drawing Sheets

FOREIGN PATENT DOCUMENTS

| | | |
|---|---|---|
| JP | A 2005-293051 | 10/2005 |
| JP | A 2005-327170 | 11/2005 |
| JP | A 2006-155512 | 6/2006 |
| JP | A 2006-344120 | 12/2006 |
| JP | A 2007-065950 | 3/2007 |

* cited by examiner

IMAGE DATA RECORDING METHOD, METHOD OF RECORDING FINISHED WORK BY IMAGE DATA, IMAGE DATA RECORDING APPARATUS, AND FINISHED WORK RECORDING SYSTEM USING IMAGE DATA

TECHNICAL FIELD

The present invention relates to a method, an apparatus, and an entire system for matching image data to data inherent to a subject to be picked up and recording the image data, and more particularly to a method, an apparatus and a system which are suitable for a method of recording a finished work in a construction field and the like and which can realize the management of information of a product to be worked and a photograph of the product having been worked by securely causing the information of the product to coincide with the photograph thereof.

BACKGROUND ART

In general, a photograph for recording a construction work is prepared by recording information of a product (piping, support, and the like) to be worked and recorded on a board such as a blackboard to show when and who constructed the product and when and who confirmed the quality of the product and simultaneously picking up the image of the product (the product to be recorded) and the information so that the photograph is associated with the information relating to the photograph. However, in this method, even if there is a mistake in the relation between the information on the board and the product to be recorded, the mistake cannot be discriminated.

Further, a lot of photographs are recorded as construction recording photographs. Recently, although digital cameras are used to take the photographs, what is recorded on the photographs is only information relating to photographing conditions such as a shutter speed and an opening of a diaphragm, and file names are record by a series of alphanumeric values automatically set by a camera main body. Thus, a person must determine which subjects are recorded in which files by obtaining the images of the subjects from the photographs recorded in the files and put the photographs in order.

Patent Document 1 discloses a technology relating to the latter problem of putting photographs in order. According to the disclosed technique, photographs can be automatically put in order in such a manner that the information relating to subjects is previously stored in a digital camera and, when the subjects are photographed by the digital camera, a worker associates the information of the photographed subjects with the photographs of the subjects. However, since the information is associated with the subjects by a person, a record itself may be mistaken or different information may be associated with the subjects with an ill-will, and thus there is a possibility that wrongdoing is performed.

RFID tags may be used to certify that data is true. An RFID tag has an ID number inherent to it and the ID number is allocated to the RFID tag when the tag is made, and thus cannot be altered. Accordingly, when RFID tags can be attached to products such as a piping and a support to certify the products acting as subjects for recording a construction work, and the information of the RFID tags can be associated with the information of the photographs of the products, it is possible to render the photographs and the subjects compatible. However, when a product different from the above product is photographed as a subject after the RFID tag information of the above product is read, the recorded data becomes false data.

The same problem may occur as to whether or not the relation between, for example, image data of an article, a person, and the like as a subject to be photographed and inherent data relating to the subject is true, in addition to works in factories, civil engineering and construction works, and the like. For example, it is more preferable to prepare data of ID photograph and a person's name so that they are compatible with each other.

Patent Document 1: Japanese Patent Application Laid-Open No. 2001-24982

DISCLOSURE OF THE INVENTION

Problems to be Solved by the Invention

An object of the present invention, which has been made in view of the above circumstances, is to overcome the problems of the conventional techniques and to provide a method, an apparatus, and a recording system for recording an image in the state that a subject truly coincides with data relating to the subject. In particular, an object of the present invention is to provide a method, an apparatus, and a recording system for recording a finished work by causing a subject recorded in a photograph to securely coincide with the condition of the subject associated with the photograph when a photograph for recording a construction work is taken.

Means for Solving the Problems

To achieve the above object, a method of recording image data according to the present invention is characterized by including attaching an identification tag, to which data relating to a subject to be picked up is recorded, to the subject to be picked up, determining whether or not a time difference between a time at which the image data of the subject to be picked up is obtained and the time at which tag data of the identification tag is read is within a preset specified time, associating the image data with tag data under the condition that both the image data obtaining work and the tag data reading work are performed, and making a record.

A method of recording a finished work using image data by obtaining a subject to be worked and the contents of the work performed to the subject to be worked as a work recording image, according to the present invention, is characterized by including attaching an identification tag, to which inherent information is recorded, to each of the subject to be worked and a work recording worker, determining whether or not tag data are true to the image data of the subject to be worked by comparing a time difference between the time at which the tag data recorded in the identification tags are read and the time at which the image data of the subject to be worked is obtained with a preset specified time, and recording a finished work.

A method of recording a finished work using image data by obtaining a subject to be worked and the contents of the work to the subject to be worked as a work recording image, according to the present invention, may be characterized by including attaching an identification tag, to which inherent information is recorded, to each of the subject to be worked and a work recording worker, obtaining position information when tag data recorded in the identification tag and position information when the image data of the subject to be worked is obtained, determining whether or not the tag data are true to the image data of the subject to be worked by comparing the difference between distances at which both the tag data and the image data are obtained, and recording a finished work.

In the method of recording the finished work using the image data having the above characteristics, when it is determined that the tag data are true to the image data, it is preferable to associate a picked-up image with the data of the subject to be worked and to perform cipher processing thereafter.

In the method of recording the finished work using the image data having the above characteristics, when it is determined that the tag data are not true to the image data, it is preferable to delete the image data and the tag data from a storage region.

An image data recording apparatus according to the present invention is characterized by including image pickup means, identification tag reading means, time measuring means for obtaining the time at which image data is obtained by the image pickup means and the time at which a tag data reading time is obtained by the identification tag reading means, and an arithmetic operation unit for determining a time difference from both the times obtained by the time measuring means, comparing the determined time difference with a preset specified time; and associating the image data with the tag data when a result obtained by the comparison is within the specified time.

An image data recording apparatus according to the present invention is characterized by including image pickup means, identification tag reading means, position measuring means for obtaining position information when image data is obtained by the image pickup means and position information when tag data is read by the identification tag reading means, and an arithmetic operation unit for determining a distance when position information is obtained from both the position informations obtained by the position measuring means, comparing the determined distance with a preset specified distance, and associating the image data with the tag data when a result obtained by the comparison is within the range of the specified distance.

A finished work recording system using image data according to the present invention is characterized by including an identification tag attached to each of a subject to be worked and a work recording worker, a server having a database which stores the subject to be worked associated with identification information recorded in the identification tag and information of the work recording worker, and a recording terminal including: identification tag reading means for reading at least tag information recorded in the identification tag; image pickup means for obtaining image data of the subject to be worked; time measuring means for measuring the time at which the tag data is read by the tag data reading means and the time at which the image data is obtained by the image pickup means or/and position measuring means for obtaining position information when the tag data is read and position information when the image data is obtained; communication means for reading out the information stored in the database of the server; and arithmetic operation means for determining a time difference between the time at which the image data is obtained and the time at which the tag data is read or/and a distance between the position where the image data is obtained and the position where the tag data is read, determining whether or not the time difference is within a preset specified time or/and whether or not the distance is within a preset specified distance by comparing the time difference or/and the distance with the preset specified time or/and the preset specified distance, reading out information associated with the tag data from the database to associate the information with the image data and store the information when the time difference is within the specified time or/and when the distance is within the range of the specified distance, and deleting the obtained image data and the read tag data when the time difference is outside of the specified time or/and when the distance is outside of the range of the specified distance.

Effects of the Invention

According to the present invention, image data can be securely associated with information relating to the image data, and the image data and the information can be recorded and managed while securing that the image data is true to the information. With this arrangement, since image data cannot be recorded based on false information, the management accuracy and the quality of the stored information can be improved.

EXPLANATION OF REFERENCE NUMERALS

10 . . . finished work recording system, 20 . . . recording terminal, 22 . . . RFID reading means, 24 . . . image pickup means, 26 . . . display means, 28 . . . information input means, 30 . . . communication means, 32 . . . time measuring means, 40 . . . arithmetic operation means, 50 . . . memory means, 60a . . . worker RFID tag, 60b . . . product RFID tag, 70 . . . server

BEST MODE FOR CARRYING OUT THE INVENTION

Specific embodiments of an image data recording method, a finished work recording method using image data, an image data recording apparatus, and a finished work recording system using image data according to the present invention will be explained below.

Figure 1:
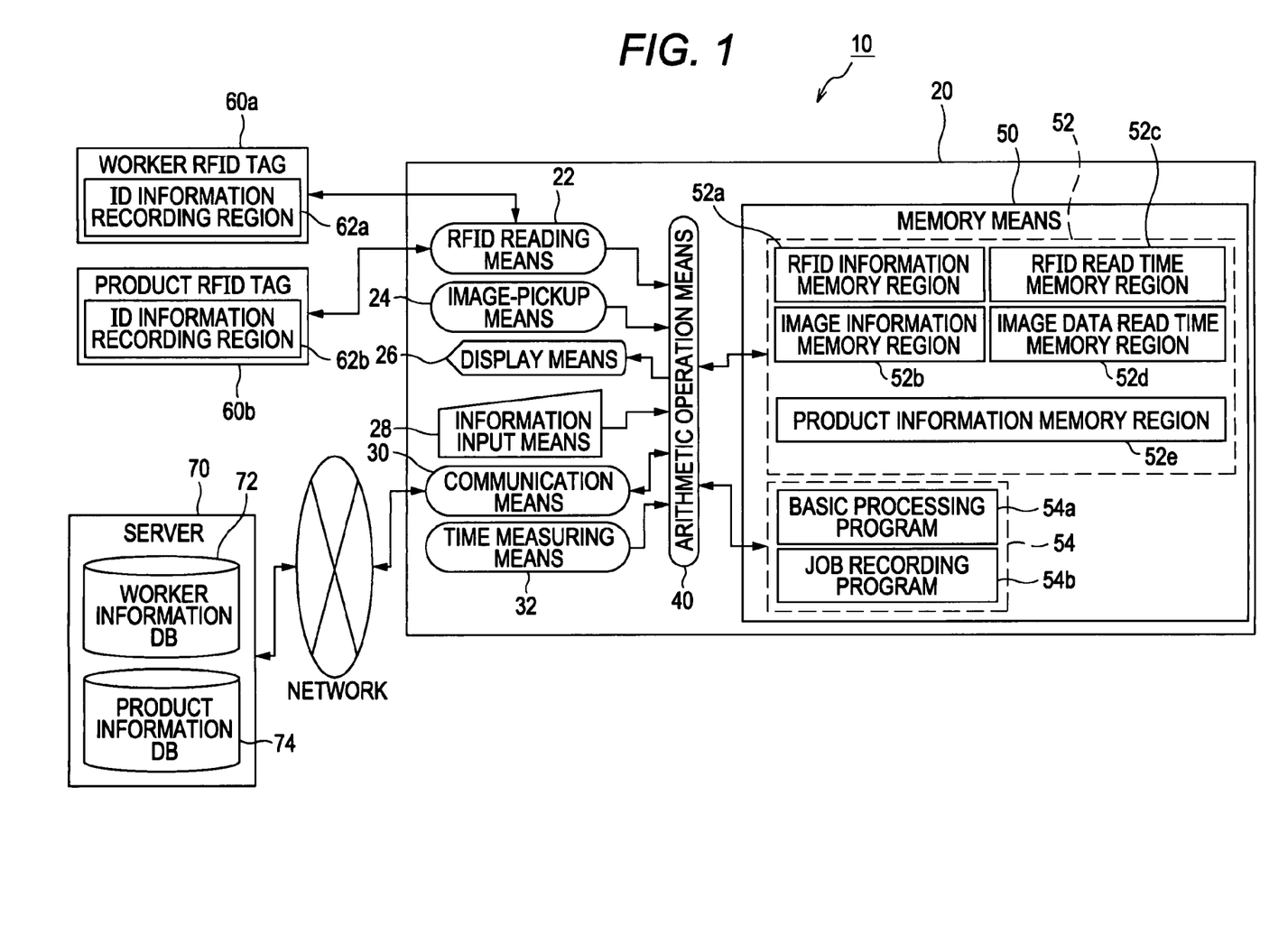
FIG. 1 is a schematic diagram showing an arrangement of a finished work recording system using image data according to a first embodiment.

First, a first embodiment of the finished work recording system using image data of the present invention will be explained with reference to FIG. 1. The finished work recording system according to the embodiment is basically composed of an RFID tag 60 (60a and 60b), a recording terminal 20, and a server 70.

The RFID tag 60 is an identification tag for identifying a product to be recorded (to-be-recorded product) and a worker who records a finished work. The RFID tag 60 includes a product RFID tag 60b attached to the product to be recorded, and a worker RFID tag 60a which is owned by a worker who records a finished work relating to the product to be recorded using the recording terminal 20. The product RFID tag 60b is directly bonded to the product to be recorded or indirectly attached thereto with a retaining band such as Insulok. The RFID tag 60 is attached to standing materials of the worker such as a helmet and a working wear so that the worker himself or herself is integrated with the worker RFID tag 60a. Further, employment of the RFID tags 60 as an identification tag allows recorded information to be read regardless of stain and a narrow space.

The RFID tag 60 includes an ID information recording region 62 (62a, 62b) to record inherent identification information (ID information) for specifying the product to be recorded to which the product RFID tag 60b is attached and the worker who owns the worker RFID tag 60a. Although not shown in detail, the RFID tag 60 has communication means and is arranged such that, upon receipt of a read signal from an RFID reading means 22 in the recording terminal 20 which will be described later in detail, it can transmit the ID information recorded in the ID information recording region 62 to the recording terminal 20 by superimposing it on an output signal.

The recording terminal 20 is roughly composed of means for obtaining and displaying various types of information, means for recording the various types of information, and means for making use of the various types of information.

Examples of the means for obtaining and displaying the information include the RFID reading means 22, image pickup means 24, display means 26, information input means 28, communication means 30, and time measuring means 32. Although the various means are shown making use of the functions thereof as a part of the names thereof, they have specific functions as described below.

The RFID reading means 22 is an antenna capable of reading the information recorded in the RFID tags 60 described above in a non-contact mode. The image pickup means 24 is a so-called digital camera for obtaining the product to be recorded as digital image data. The display means 26 is a display for displaying image data obtained through the image pickup means 24, information input by the information input means 28 to be described later, and various types of necessary information in the state in which the worker can visually recognize it. The information input means 28 is means for inputting the various types of necessary information and may input the information through keys such as buttons (not shown) or through a touch panel system making use of the display means 26 described above, that is, the information input means 28 can employ various types as necessary. The communication means 30 is means for communicating with the server 70 which will be described later in detail and is means for obtaining product information, record information, the worker information, and the like in databases 72, 74 constructed in the server 70. The time measuring means 32 is a clock disposed in the recording terminal 20 and arranged to function in association with the RFID reading means 22 and the image pickup means 24 described above through arithmetic operation means 40 which will be described in detail later. When the respective means function, the time measuring means 32 records the dates when they function in memory means 50 to be described later.

Further, means for recording the information is the memory means 50 such as a memory and a disc. The memory means 50 has a temporary data storage region 52 and a resident data storage region 54 formed therein, and each region is further minutely divided into recording regions.

For example, the temporary data storage region 52 has memory regions formed therein to store the information obtained as to the product to be recorded, such as an RFID information memory region 52a, an image information memory region 52b, an RFID read time memory region 52c, an image data read time memory region 52d, and a product information memory region 52e.

The RFID information memory region 52a is a region for temporarily storing the information recorded in the product RFID tag 60b, which is attached to the product to be recorded that is read by the RFID reading means 22, and the information recorded in the worker RFID tag 60a owned by the worker, that is, a region for temporarily storing the ID information. The image information memory region 52b is a region for temporarily storing, for example, the image data of the product to be recorded that is obtained by the image pickup means 24, and the data obtained by combining the information stored in a product information memory region 52e to be described later with the image data. The RFID read time memory region 52c is a region for storing the date and time measured by the time measuring means 32 when the RFID reading means 22 reads the ID information stored in the worker RFID tag 60a or/and the product RFID tag 60b. The image data read time memory region 52d is a region for storing the date and time measured by the time measuring means 32 when the image pickup means 24 obtains the image data of the product to be recorded. The product information memory region 52e is a region for storing, for example, the information relating to the product to be recorded, which is obtained from a product information database 74 of the server 70 through the communication means 30 based on the ID information stored in the product RFID tag 60b read by the RFID reading means 22, the worker information obtained from the worker information database 72, and the information obtained by an examination and the like and input by the information input means 28.

Further, the resident data storage region 54 stores programs used to process various types of obtained data such as a basic processing program 54a and a work recording program 54b.

In addition to the above programs, the basic processing program 54a includes the programs exemplified below: first, a program for referring to the worker information database 72 and the product information database 74 of the server 70 through the communication means 30 and recording new information to the databases 72, 74; second, a program for performing processing such as sort and storage of information to the respective regions of the temporary data storage region 52 of the memory means 50 and deletion of the stored information; and a program for transmitting and receiving information to and from inside and outside of the recording terminal 20.

Further, the work recording program 54 includes the programs exemplified below: first, a program for subtracting the date and time stored in the RFID read time memory region 52c from the data and time stored in the image data read time memory region 52d to calculate an operation time required from the time at which the RFID tag 60 is read to the time at which the product to be recorded is photographed; second, a program for comparing the operation time with a preset specified time (threshold value) to determine whether or not a false action is performed from the time at which the RFID tags 60 is read to the time at which photographing is performed, wherein it is sufficient to determine that the false action is not performed when subtraction of the operation time from the specified time results in a solution of 0 or more and that the false action is performed when the solution is less than 0, and it is a matter of course that the above determination method is only an example, and even if other determination method is employed, it does not affect the execution and the advantage of the present invention; third, a program for performing processing for coupling the image data stored in the image information memory region 52b with, for example, the information relating to the product stored in the product information memory region 52e; fourth, a program for subjecting the information, in which various types of data are coupled with each other, to encipher processing to prevent the information from being falsely interpolated; and a program for subjecting the various types of data to conversion processing.

Although not shown, the memory means 50 is also provided with a region for storing the specified time used to determine whether or not the image data described above is true. The specified time may be a value which can be changed in respective working fields or a value which is fixed and resident at times.

Further, the means for making use of information is the arithmetic operation means 40 which stores the various types of information obtained by the means for obtaining and displaying the information described above using the basic processing program 54a and the work recording program 54b and also performing processing based on the various types of information stored in the memory means 50.

Although the recording terminal 20 having the various types of means as described above may make use of mobile digital equipment such as PDA (Personal Digital Assistant), a mobile phone, and a digital camera, it may be also a personal computer.

Figure 2:
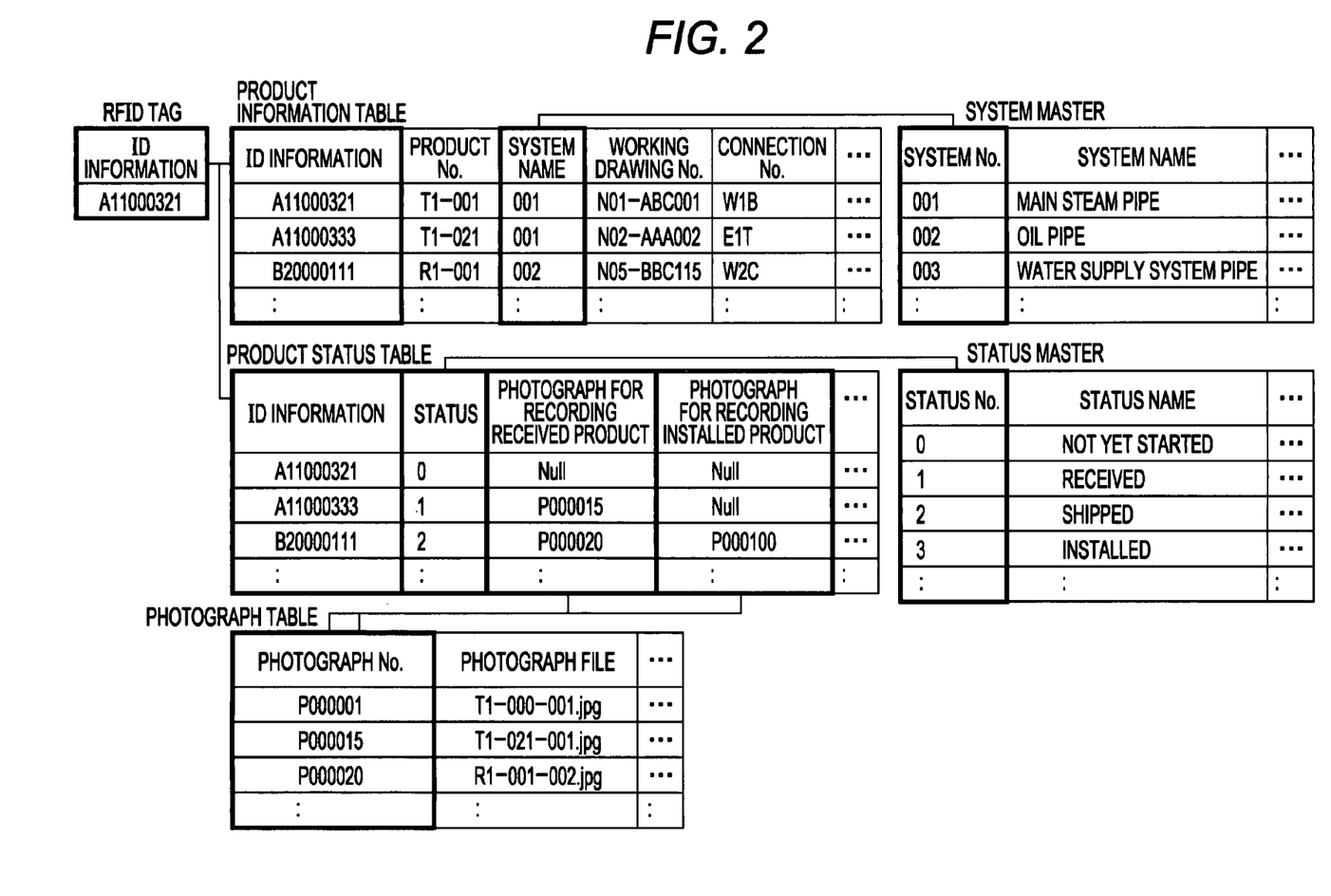
FIG. 2 is a view showing an example of information to be recorded in a database constructed in a server.

The server 70 is a computer which is wired- or wireless-connected to the recording terminal 20 through a network. The product information database 74, in which the information of the products to be recorded is stored together, and the worker information database 72, in which the information of the workers who photograph the products to be recorded is stored together, are constructed in the server 70. The product information database 74 is recorded with product names, systems, figure numbers, and the like (product information) which are associated with the ID information recorded in the product RFID tag 60b as well as with a progress, determination of a result of examination, and the like (record information) (refer to FIG. 2). The worker information database 72 is recorded with worker's names and the like (worker information) associated with the ID information recorded in the worker RFID tag 60a (not shown).

Figure 3:
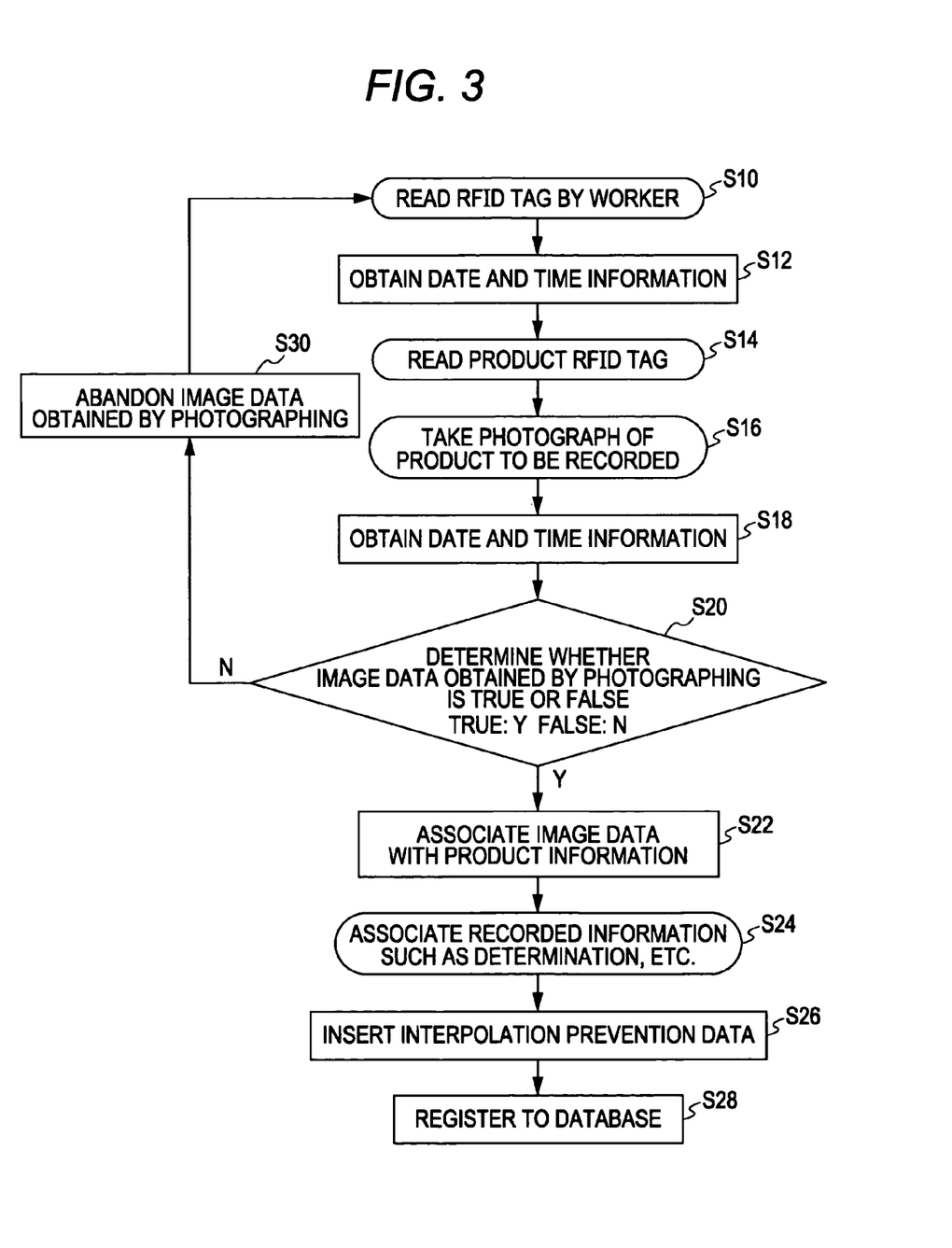
FIG. 3 is a flowchart showing a finished work recording procedure in the finished work recording system using the image data according to the first embodiment.

Next, a procedure for recording the finished work by the finished work recording system 10 arranged as described above according to the embodiment will be explained with reference to FIG. 3. First, the ID information recorded in the worker RFID tag 60a owned by the worker is read making use of the RFID reading means 22 (S10). When the ID information recorded in the worker RFID tag 60a is read, the arithmetic operation means 40 starts the basic processing program 54a and causes it to perform processing for obtaining from the time measuring means 32 the date and time information (time) when the ID information is read, storing the read ID information in the RFID information memory region 52a, and storing the date and time information in the RFID read time memory region 52c (S12).

Figure 4:
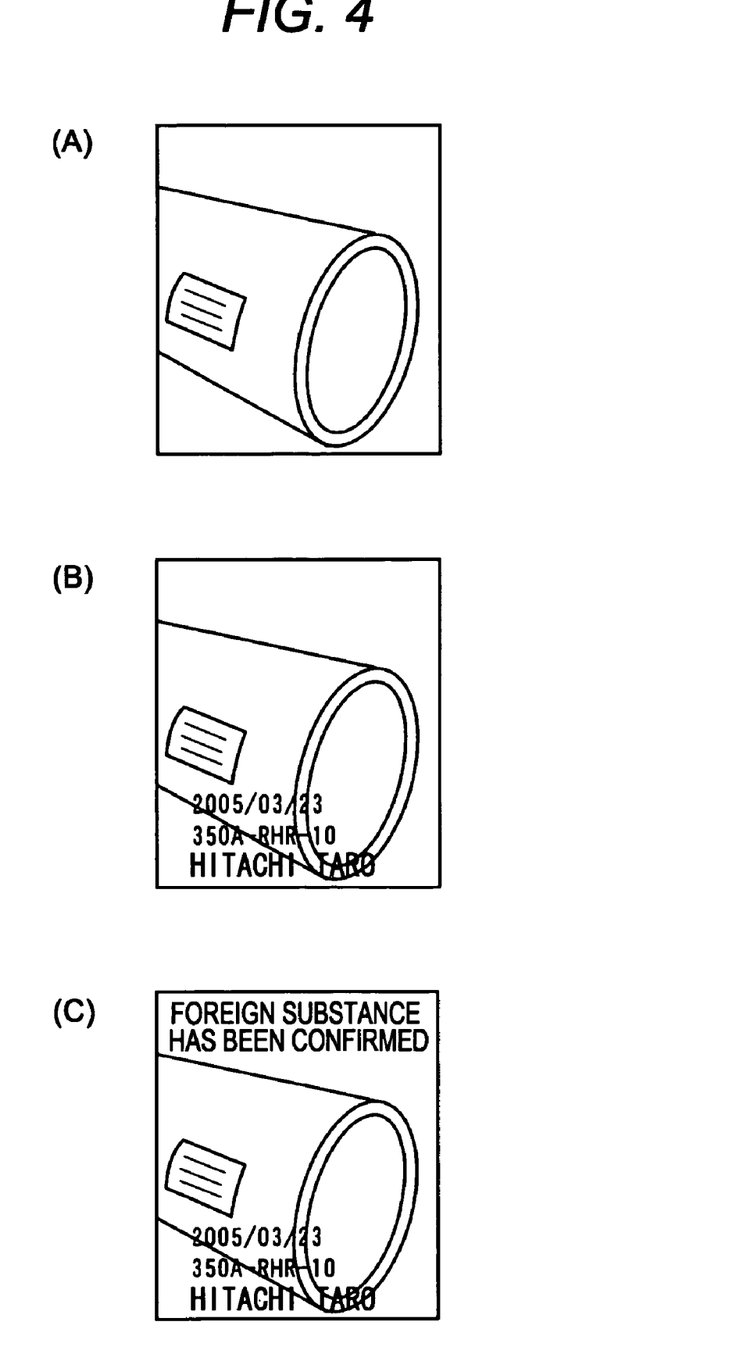
FIGS. 4(A) to 4(C) are views showing an example in which obtained image data is associated with information relating to a product to be recorded.

Next, the ID information, which is recorded in the product RFID tag 60b attached to the product to be recorded, is read making use of the RFID reading means 22 (S14). Thereafter, the image data of the product to be recorded is obtained using the image pickup means 24 (S16). When the image data of the product to be recorded is obtained, the arithmetic operation means 40 starts the basic processing program 54a and causes it to perform processing for obtaining from the time measuring means 32 the date and time information when the image data is obtained, storing the read image data in the image information memory region 52b, and storing the date and time information in the image data read time memory region 52d (S18). FIG. 4(A) shows an example of obtained image data. Note that the image data shown in FIG. 4 shows an example for recording a finished work when foreign substances in a piping are examined.

When the worker RFID tag 60a is read and the image data of the product to be recorded is obtained, the arithmetic operation means 40 starts the work recording program 54b and determines whether the obtained image data is true or false. To determine whether the obtained image data is true or false, first, the date and time information ($t_0$) stored in the RFID read time memory region 52c is subtracted from the date and time information ($t_1$) stored in the image data read time memory region 52d to obtain a time difference ($t_d$) therebetween. Thereafter, the time difference ($t_d$) is compared with a photographing permission time ($t_a$) which is a preset specified time, and whether the obtained image data is true or false is determined depending on whether or not the time difference ($t_d$) is within the range of the photographing permission time ($t_a$). When the time difference ($t_d$) is within the range of the photographing permission time ($t_a$), the image data is determined true, whereas when the time difference ($t_d$) exceeds the range of the photographing permission time ($t_a$), it is determined false. Note that the photographing permission time is set by the time during which it is assumed that a worker can not move to another subject to be recorded and to another location until he or she obtains the image data after he or she reads the worker RFID tag 60a. Accordingly, the photographing permission time ($t_a$) can be changed depending on the environment and the like of a work field (S20).

When the image data is determined true in the determination whether the image data is true or false, the arithmetic operation means 40 starts the basic processing program 54a, refers to the product information database 74 and the worker information database 72 of the server 70 through the communication means 30, and obtains the product information and the worker information associated with the read ID information to store the information in the product information memory region 52e. Thereafter, the arithmetic operation means 40 starts the work recording program 54b, reads out the image data stored in the image information memory region 52b, the product information stored in the product information memory region 52e, and the worker information, and associates the image data with the product information and the worker information (coupling, data link, and the like). Since a format of a digital photograph has a region in which arbitrary information can be written in addition to a shutter speed, an aperture condition, and the like, the information can be associated with each other by recording it in the region (S22). FIG. 4(B) shows an example of an image in which the image data is associated with the product information, and the worker information. In FIG. 4(B), a configuration is made to show the associated information by overlapping it on the image. The above display mode makes it easy to recognize work data.

After the image data is associated with the product information and the worker information, the worker inputs various record information such as the determination of the result of examination and the progress, which are obtained by a work through the information input means. The arithmetic operation means 40 starts the work recording program 54b and performs processing for associating the record information with the image data with which the product information and the worker information are associated. Note that it is sufficient to store the information with which the various types of information is associated in the image information memory region 52*b* and other storage region (not shown) (S24). FIG. 4(C) shows an example in which the record information is associated with the image shown in FIG. 4(B).

After the product information, the worker information, and the record information are associated with the image data, the arithmetic operation means 40 starts the work recording program 54*b* and performs the encipher processing so that the information is not interpolated. As to the cipher processing, it is sufficient to apply, for example, electronic watermark and time stamp to the image data (S26).

After the various processings are finished, the arithmetic operation means 40 starts the basic processing program 54*a* and stores the image data, and the product information, the worker information, the record information, and the like associated with the image data in the databases 72, 74 of the server 70 or in other new database through the communication means 30 (S28).

In contrast, when the image data is determined false by the determination at step 20, the image data and the ID information stored in the temporary data storage region 52 of the memory means 50 and the date and time information obtained in association with the image data and the ID information are abandoned. This is a means for preventing registration of false information, and even if the image data or the like is dismissed by an erroneous determination of the worker, it is sufficient for the worker in a field to read the RFID tags 60 again and to photograph the product to be recorded in the field. Thus, no problem occurs to record a finished work (S30).

A target recording photograph can be caused to securely coincide with the information relating to the photograph by recording the finished work by the procedure described above. It is possible to record the finished work under the condition that interpolation and a false action with an ill-will can not be performed. The work record can be put in order in a short time. Since the image data can be also managed by attaching the information of the product to be recorded thereto, it is also possible to automatically perform a work for sorting the image data to respective products to be recorded, which is conventionally performed manually based on the image data, on the basis of the information and the like of the products to be recorded associated with the image data. Created management information is conventionally confirmed by a person. However, when the image data is caused to securely coincide with the product to be recorded, the confirmation work can be omitted, whereby information management can be rationalized.

Figure 5:
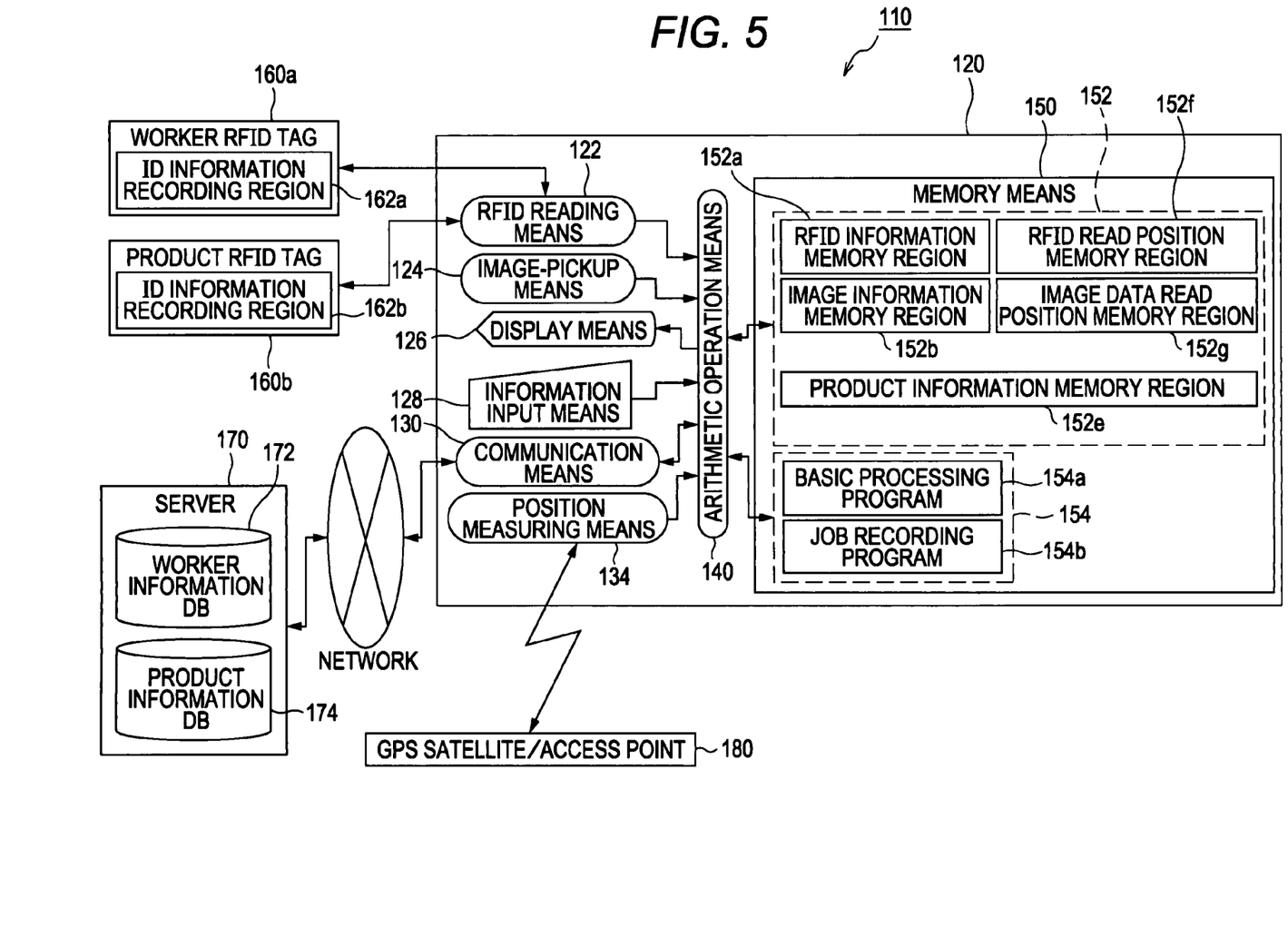
FIG. 5 is a schematic diagram showing an arrangement of a finished work recording system using image data according to a second embodiment.

Next, a second embodiment according to the finished work recording system using the image data of the present invention will be explained with reference to FIG. 5. Note that almost all the arrangements of the finished work recording system according to the second embodiment are the same as the finished work recording system 10 according to the first embodiment described above. Therefore, the components of the second embodiment whose functions are the same as those of the first embodiment are denoted by reference numerals obtained by adding 100 to the reference numerals shown in FIG. 1, and the detailed explanation thereof is omitted.

The finished work recording system 110 according to the second embodiment is characterized in that it is provided with position measuring means 134 in place of the time measuring means 32 shown in the finished work recording system 10 according to the first embodiment. The position measuring means 134 is means for, when the ID information recorded in a worker RFID tag 160*a* is read and when the image data of the product to be recorded is obtained, obtaining the position information at which the work is performed likewise the time measuring means 32. Accordingly, an RFID read position memory region 152*f* and an image data read position memory region 152*g* are secured in a temporary data storage region of memory means 150 in place of the RFID read time memory region 52*c* and the image data read time memory region 52*d*.

As a specific example of the position measuring means 134, it is sufficient to make use of a position detecting system using a network through GPS (Global Positioning System) and a wireless LAN (Local Area Network). When, for example, GPS is used, absolute position information such as a latitude and a longitude can be obtained by transmitting a signal for requesting to obtain position information from the position measuring means 134 to a GPS satellite 180 so as to obtain a returned signal. Whether or not the information relating to the product to be recorded and the like is matched to the obtained image data can be determined by determining the amount of dislocation of the position information of the latitude and the longitude obtained using GPS based on a preset specified distance (threshold value) likewise the determination using the time (date and time) measurement described above to determine whether or not the image data is true.

Incidentally, when a working field is located indoor, it may be difficult to use GPS. In this case, it is sufficient to detect a position making use of the network using the wireless LAN described above. Specifically, it is sufficient to dispose a plurality of access points 180 of the wireless LAN in which position information is previously recorded and to perform trilateration making use of at least three of the access points 180. An actual survey may be performed making use of a communication speed, an electric field strength, and the like between the access points 180 and a recording terminal 120. Further, although an error of position information occurs in a unit of several meters in generally used GPS, GPS can be applied to a large scale building such as a plant when position information can be measured within an error of 1 m or less.

A finished work is recorded by the finished work recording system 110 described above through the steps shown in FIG. 6. First, the worker reads the worker RFID tag 160*a* owned by himself or herself using RFID reading means 122 (S110). When the worker RFID tag 160*a* is read, the information of the position at which the worker RFID tag 160*a* is read (position information ($V_0$)) is obtained through the position measuring means 134 (S112). Thereafter, a product RFID tag 160*b* attached to the product to be recorded is read using the RFID reading means 122 (S114), and the image data of the product to be recorded is obtained (S116). When the image data is obtained, the information of the position at which the image data is obtained through the position measuring means 134, that is, the information of the position at which the product to be recorded is photographed (position information ($V_1$)) is obtained (S118).

Figure 6:
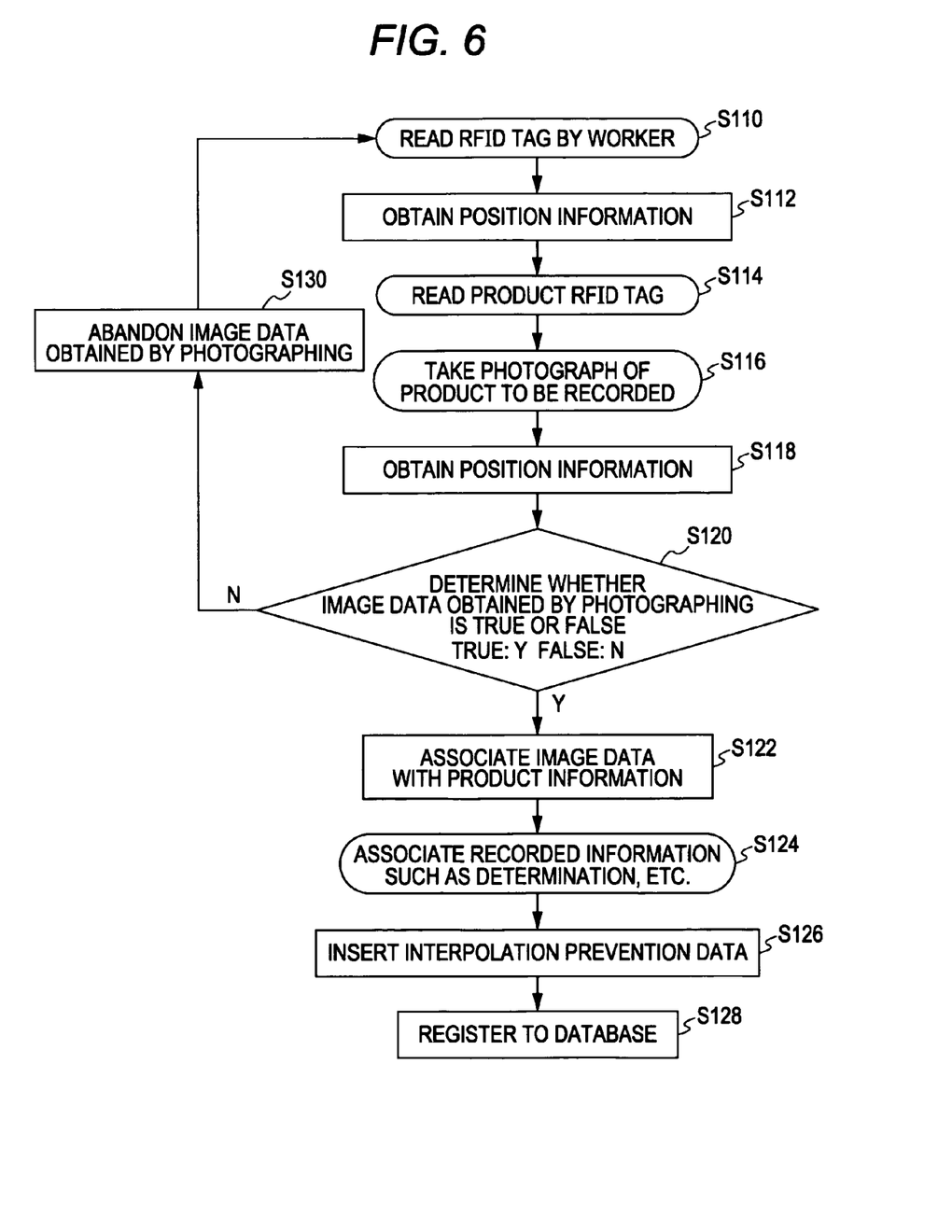
FIG. 6 is a flowchart showing a finished work recording procedure in the finished work recording system using the image data according to the second embodiment.

After the position informations ($V_0$) and ($V_1$) are obtained, the difference (position information ($V_d$)) between both the pieces of the position information is obtained, and determination of the image data is performed based on a preset specified distance (photographing permission distance ($V_a$)). The determination is performed based on whether or not the position information ($V_d$) is within the range of the photographing permission distance ($V_a$). When the position information ($V_d$) is within the range of the photographing permission distance ($V_a$), it is determined that the image data is true, whereas when the position information ($V_d$) is not within the range of the photographing permission distance ($V_a$), it is determined that the image data is false (S120).

When the image data is determined true, the product information of the product to be recorded, which is obtained through the communication means, and the worker information of the worker who photographs the product, are associated with the image data (S122). Thereafter, record information such as the progress of the work input by the worker, and the determination of a result of examination is associated with the image data (S124), and interpolation prevention data is added thereto (S126).

The record information relating to the finished work created as described above is recorded to a product information database 174 and the like of a server 170 through communication means 130 (S128). Note that when the image data is determined false in the determination at S120, the obtained image data, ID information, and date and time information are dismissed (S130) likewise the first embodiment.

A target recording photograph can be caused to securely coincide with the information relating to the photograph also in the finished work recording system 110 likewise the first embodiment. Further, the finished work can be recorded under the condition in which interpolation and a false action with an ill-will cannot be performed. Further, the work record can be put in order in a short time.

Figure 7:
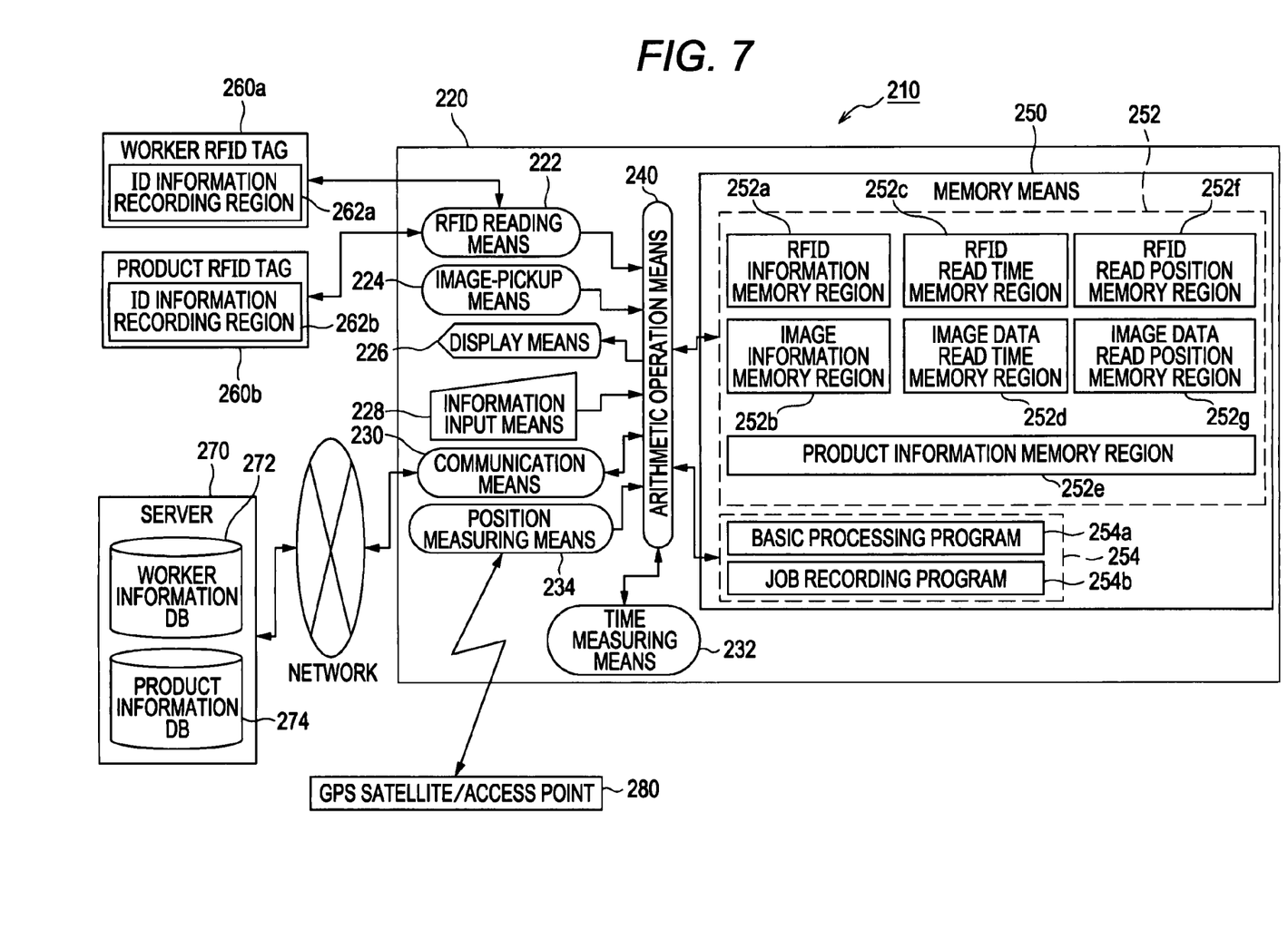
FIG. 7 is a schematic diagram showing an arrangement of a finished work recording system using image data according to a third embodiment.

Next, a third embodiment according to the finished work recording system using the image data of the present invention will be explained with reference to FIG. 7. The finished work recording system according to the third embodiment is arranged by combining the finished work recording systems according to the first and second embodiments and characterized by determining whether the image data of the product to be recorded, which is obtained using both the date and time information and the position information, is true or false. Accordingly, the components of the third embodiment whose functions are the same as those of the first embodiment are denoted by the reference numerals obtained by adding 200 to the reference numerals shown in FIG. 1. Thus, the components of the third embodiment whose functions are the same as those of the second embodiment are denoted by the reference numerals obtained by adding 100 to the reference numerals shown in FIG. 5, and the detailed explanation of the components are omitted.

Even the finished work recording system 210 arranged as described above can obtain the same advantage as those of the finished work recording systems 10, 110 shown in the first and second embodiments. Further, since whether obtained image data is true or false is determined based on the two pieces of information, that the date and time information and the position information, the reliability of a result of determination is increased, whereby the management accuracy of finished work record being stored can be improved.

It is described in the above respective embodiments that to create the finished work record information, first, the date and time information or/and the position information are obtained by reading the worker RFID tag 60*a* (160*a*, 260*a*). However, when the present invention is embodied, the product RFID tag 60*b* (160*b*, 260*b*) may be read first, and the date and time information, the position information, and the like may be obtained based on the read product RFID tag 60*b* (160*b*, 260*b*). Further, the date and time information or/and the position information may be obtained by reading both the worker RFID tag 60*a* and the product RFID tag 60*b*.

Further, the above embodiments explain that the RFID tags are used as an identification tag, the identification tag may be a tag to which a two-dimensional code such as a bar code and a QR code is attached. When the identification tag is used, the RFID reading means may be arranged as reading means dedicated to various types of codes.

Further, although the embodiments explain an example in which the finished work in a construction field, a work field, and the like is recorded using the image data, it is considered that the image data recording method can be applied to a wider range.

For example, the image data recording method can be also applied to confirm an identical person in various types of ID photographs of a driver's license, a passport, and the like. Further, it is considered that the method can be also applied to put photographs taken in a travel in order. In this case, when tourist associations of respective districts previously attach ID tags to sightseeing spots, the image data of the commemorative photographs which are taken after the ID tags are read are automatically allocated with the names and the like of the sightseeing spots. With this arrangement, locations in which sightseeing was performed can be discriminated by any person, which is useful to put photographs in order.

The invention claimed is:

1. A method of recording image data, including:
   attaching an identification tag, to which data relating to a subject to be picked up is recorded, to the subject to be picked up;
   determining whether or not a time difference between the time at which image data of the subject to be picked up is obtained and the time at which tag data of the identification tag is read is within a preset specified time;
   associating the image data with tag data under the condition that both the image data obtaining work and the tag data reading work are performed within the specified time; and
   making a record.

2. A method of recording a finished work using image data by obtaining a subject to be worked and the contents of the work performed to the subject to be worked as a work recording image, including:
   attaching an identification tag, to which inherent information is recorded, to each of the subject to be worked and a work recording worker;
   comparing the time difference between the time at which the tag data recorded to the identification tags are read and the time at which the image data of the subject to be worked is obtained with a preset specified time to determine whether or not the tag data are true to the image data of the subject to be worked; and
   recording a finished work.

3. The method of recording the finished work using the image data according to claim 2, including:
   associating a picked-up image with the data of the subject to be worked when it is determined that the tag data are true to the image data; and
   performing cipher processing thereafter.

4. The method of recording the finished work using the image data according to claim 2, including deleting the image data and the tag data from a storage region when it is determined that the tag data are not true to the image data.

5. A method of recording a finished work using image data by obtaining a subject to be worked and the contents of the work to the subject to be worked as a work recording image, including:
   attaching an identification tag, to which inherent information is recorded, to each of the subject to be worked and a work recording worker;
   obtaining position information when tag data recorded in the identification tag and position information when image data of the subject to be worked is obtained;
   comparing a difference between the distances at which both the tag data and the image data are obtained to determine whether or not the tag data are true to the image data of the subject to be worked; and recording a finished work.

6. The method of recording the finished work using the image data according to claim 5, including:

associating a picked-up image with the data of the subject to be worked when tag data are determined true to the image data; and performing cipher processing thereafter.

7. The method of recording the finished work using the image data according to claim 5, including deleting the image data and the tag data from a storage region when it is determined that the tag data are not true to the image data.

8. An image data recording apparatus, including:

image pickup means;

identification tag reading means;

time measuring means for obtaining the time at which image data is obtained by the image pickup means and the time at which a tag data reading time is obtained by the identification tag reading means; and an arithmetic operation unit for determining a time difference from both the times obtained by the time measuring means, comparing the determined time difference with a preset specified time; and associating the image data with the tag data when a result obtained by the comparison is within the specified time.

9. An image data recording apparatus, including:

image pickup means;

identification tag reading means;

position measuring means for obtaining position information when image data is obtained by the image pickup means and position information when tag data is read by the identification tag reading means; and an arithmetic operation unit for determining a distance when position information is obtained from both the position informations obtained by the position measuring means, comparing the determined distance with a preset specified distance, and associating the image data with the tag data when a result obtained by the comparison is within the range of the specified distance.

10. A finished work recording system using image data, including:

an identification tag attached to each of a subject to be worked and a work recording worker;

a server having a database that stores the subject to be worked associated with identification information recorded in the identification tag and information of the work recording worker; and a recording terminal including: identification tag reading means for reading at least tag information recorded in the identification tag; image pickup means for obtaining image data of the subject to be worked; time measuring means for measuring the time at which the tag data is read by the tag data reading means and the time at which the image data is obtained by the image pickup means or/and position measuring means for obtaining position information when the tag data is read and position information when the image data is obtained; communication means for reading out the information stored in the database of the server; and arithmetic operation means for determining a time difference between the time at which the image data is obtained and the time at which the tag data is read or and a distance between the position where the image data is obtained and the position where the tag data is read, determining whether or not the time difference is within a preset specified time or/and whether or not the distance is within a preset specified distance by comparing the time difference or/and the distance with the preset specified time or/and the preset specified distance, reading out the information associated with the tag data from the database and associating the information with the image data to store the information when the time difference is within the specified time or/and when the distance is within the range of the specified distance, and deleting the obtained image data and the read tag data when the time difference is outside of the specified time or/and when the distance is outside of the range of the specified distance.

* * * * *